United States Patent
Forwerck

(10) Patent No.: US 10,741,955 B2
(45) Date of Patent: Aug. 11, 2020

(54) SENSOR ASSEMBLY AND METHOD FOR ASSEMBLING A SENSOR CONNECTOR ASSEMBLY

(71) Applicant: Autoliv ASP, Inc., Ogden, UT (US)

(72) Inventor: Joshua Forwerck, Royal Oak, MI (US)

(73) Assignee: VEONEER US, INC., Southfield, MI (US)

( * ) Notice: Subject to any disclaimer, the term of this patent is extended or adjusted under 35 U.S.C. 154(b) by 97 days.

(21) Appl. No.: 15/279,605

(22) Filed: Sep. 29, 2016

(65) Prior Publication Data

US 2018/0090868 A1    Mar. 29, 2018

(51) Int. Cl.
| | |
|---|---|
| H01R 13/405 | (2006.01) |
| H01R 13/24 | (2006.01) |
| G01L 19/14 | (2006.01) |
| G01L 19/00 | (2006.01) |
| G01P 1/02 | (2006.01) |
| H01R 13/05 | (2006.01) |
| H01R 43/20 | (2006.01) |
| H01R 13/66 | (2006.01) |

(52) U.S. Cl.
CPC ........ *H01R 13/405* (2013.01); *G01L 19/0069* (2013.01); *G01L 19/147* (2013.01); *G01P 1/023* (2013.01); *H01R 13/05* (2013.01); *H01R 13/2442* (2013.01); *H01R 43/20* (2013.01); *H01R 13/6683* (2013.01); *H01R 2201/20* (2013.01)

(58) Field of Classification Search
CPC ...... H01R 13/405; H01R 13/05; H01R 43/20; G01L 19/0069; G01P 1/023
See application file for complete search history.

(56) References Cited

U.S. PATENT DOCUMENTS

| | | | | |
|---|---|---|---|---|
| 5,971,775 A * | 10/1999 | Tor | .................... | H01R 12/7023 439/79 |
| 6,341,562 B1 * | 1/2002 | Brisighella | ............. | B60R 21/26 102/200 |
| 7,233,141 B2 * | 6/2007 | Fouquet | .............. | B29C 45/1671 324/207.25 |
| 7,291,023 B1 * | 11/2007 | Still | ........................ | B60R 21/01 439/65 |
| 7,412,895 B2 * | 8/2008 | Asada | ................. | G01L 19/0084 73/706 |
| 7,433,197 B2 * | 10/2008 | Steele | ................. | B60R 16/0231 361/752 |
| 8,028,584 B2 * | 10/2011 | Otsuka | ................ | G01L 19/0069 73/706 |
| 8,234,034 B2 | 7/2012 | Brisighella, Jr. et al. | | |
| 8,340,857 B2 * | 12/2012 | Brisighella, Jr. | ........ | H05K 5/06 280/735 |
| 8,618,425 B2 * | 12/2013 | Hortig | .................. | B81B 7/0064 174/377 |
| 8,914,183 B2 | 12/2014 | Forwerck et al. | | |

(Continued)

*Primary Examiner* — Paul D Kim

(74) *Attorney, Agent, or Firm* — Dickinson Wright PLLC

(57) ABSTRACT

A sensor assembly is provided with a housing, a sensor package, and terminals. The housing may include a connector opening configured to mate with a wire harness connector. The sensor package may include conductive pads exposed in a surface of the sensor package. The terminals may be inserted into the housing and extend into the connector opening. The terminals form an electrical and mechanical connection the conductive pads of sensor package.

19 Claims, 3 Drawing Sheets

(56) References Cited

U.S. PATENT DOCUMENTS

| | | |
|---|---|---|
| 8,941,018 B2 | 1/2015 | Kunert et al. |
| 8,972,116 B2* | 3/2015 | Leach .................... B60R 19/02 |
| | | 180/274 |
| 9,107,309 B2 | 8/2015 | Kurle |
| 9,235,937 B1 | 1/2016 | Weinberg |
| 2008/0084005 A1* | 4/2008 | Steele .................... B60R 21/01 |
| | | 264/272.14 |
| 2014/0158420 A1 | 6/2014 | Haiss et al. |
| 2018/0023981 A1* | 1/2018 | Forwerck ............ B60R 16/0231 |

* cited by examiner

SENSOR ASSEMBLY AND METHOD FOR ASSEMBLING A SENSOR CONNECTOR ASSEMBLY

BACKGROUND

The present application relates generally to a sensor assembly.

Sensors are used for many different operations within a vehicle. For example, occupant restraint and safety systems typically need to sense relatively large/abrupt changes in acceleration and/or rotational rate over a short time period. Often these sensor are packaged with supporting electronics and typically mounted on a circuit board. The circuit board may then be mounted into a housing or directly to a vehicle structure. Such mounting can cause a number of problems related to manufacturing and reliability.

BRIEF SUMMARY

In satisfying the above need, as well as overcoming the enumerated drawbacks and other limitations of the related art, the present application provides an improved sensor assembly.

The sensor assembly may include a housing and terminals that are configured to interface with a leadless sensor package. The leadless sensor package may provide improved manufacturability and durability of the assembly. The terminals may be inserted to provide a spring force against pads of the leadless sensor package to mechanically support an electrical connection between the leadless sensor package and the terminals.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Figure 1:
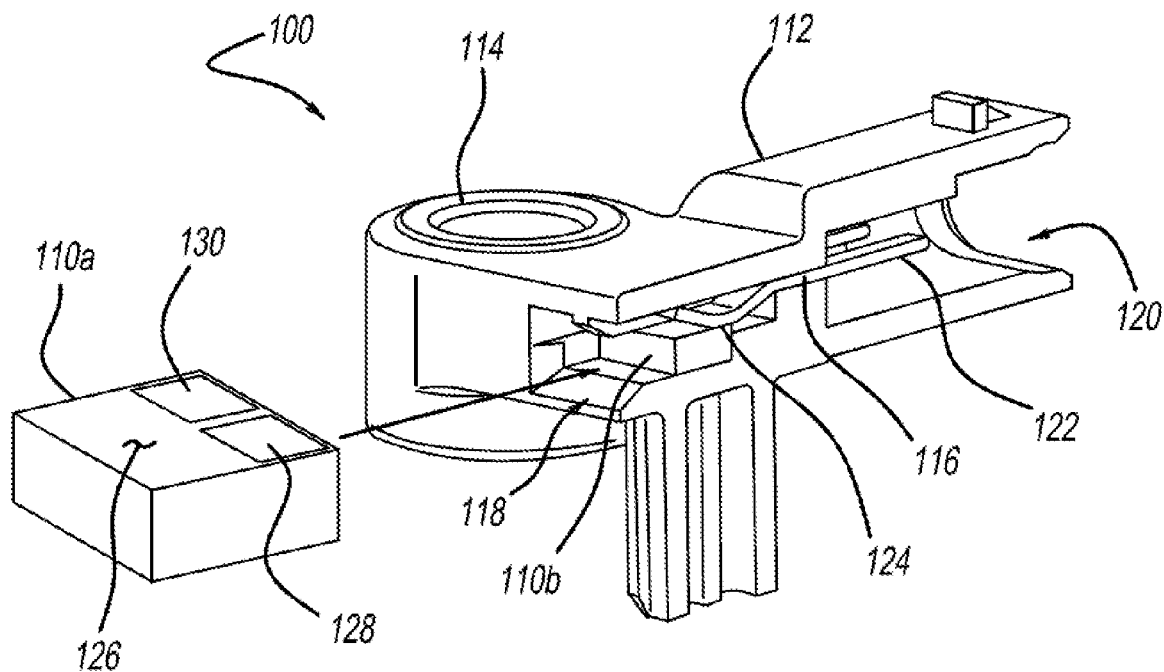
FIG. 1 is a cut away view of a sensor assembly.

FIG. 1 is a cut away view of a sensor assembly 100. The sensor assembly 100 includes a housing 112, a sensor package 110*b*, and terminals 116. The housing 112 may be a polymer housing and made of material similar to many other automotive connector housings. The housing 112 may include a bushing 114 for mounting the sensor assembly 100 to a vehicle structure. The bushing 114 may be a metal bushing. The housing 112 may be injection molded. The housing 112 may be molded in a single step without other components. As such, the terminals 116, bushing 114 and sensor package 110*b* may be inserted into an opening 118 in the housing 112 after the molding process. In some implementations, the certain components may be insert molded into the housing 112. For example, any one of the terminals 116, bushing 114 and sensor package 110*b* may be placed in the mold and plastic may be injected around the inserted components to form the housing and secure the inserted component. In some implementations, the components may be molded into the assembly in multiple steps. As such, one or more of the terminals 116, bushing 114 and sensor package 110*b* may be pre-molded into a sub-component and the sub-component may be insert molded to form part of the housing 112. For example, the terminals 116 and the sensor package 110*b* may be pre-molded together in a fixed position, then the pre-molded assembly may be inserted into or insert molded into the connector housing.

The sensor package 110*b* may be a MEMS, accelerometer, pressure, or temperature sensor package. For example, the accelerometer sensor package may be used for deploying safety systems, such as air bags, active restraints, or similar systems. The sensor package 110*b* may be a leadless sensor package. As such, the leadless sensor package may not include a circuit board, but rather may include only the sensing chip enclosed in a protective layer and including connection pads exposed in the surface of the protective layer for electrically connecting with the sensor package 110*b*. The sensor package 110*b* may be configured for solderless physical and electrical connection with the terminals 116. One example of the sensor package 110*b* is illustrated as enlarged sensor package 110*a*. The sensor package 110*a* includes a sensing chip enclosed in a protective casing. Pads 128 and 130 are exposed through surface 126 of the sensor package 110*a*. The pads 128 and 130 may be flush with the surface 126. Further, pads 128 and 130 may be positioned such that when the sensor package 110*b* is fully inserted into the housing 112, the pads 128 and 130 align with corresponding terminals 116 inserted within the housing 112.

In some implementations, the housing 112 may include surfaces to locate the sensor package 110*b* relative to the terminals 116. In one example, the housing may include a first opening that forms a first cavity 120. The first cavity 120 may be configured to receive a mating connector, for example, from a wire harness to electrically connect the sensor to a controller. A connection portion 122 of the terminals 116 may extend into the first cavity 120 and be configured to provide electrical connection to mating terminals in the mating connector. A pad portion 124 of the terminals 116 may provide a spring force against the sensor package 110*b*. The spring force may provide a continuous and firm physical contact between the terminals 116 and the sensor package 110*b*. The spring force may also provide a firm contact between the sensor 110*b* and the housing 112.

It is understood that any of the features described above with respect to FIG. 1 may be used in conjunction with other features described elsewhere in this application.

Figure 2:
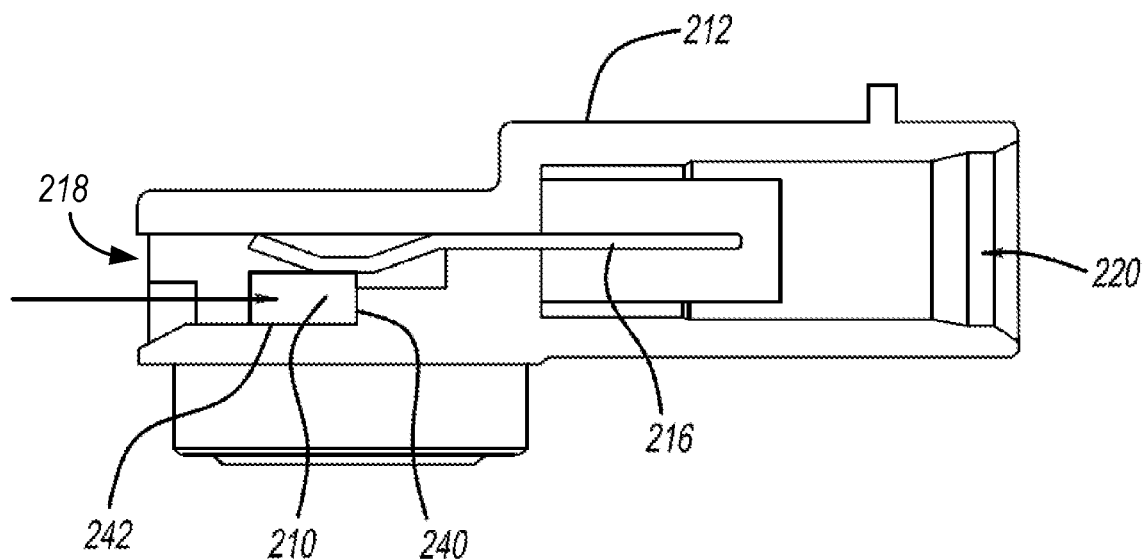
FIG. 2 is a sectional side view of a sensor assembly illustrating a insertion cavity.

FIG. 2 is a sectional side view of a sensor assembly illustrating a insertion cavity. The sensor assembly includes a housing 212, a sensor package 210, and terminals 216. The housing 212 may be a polymer housing and manufactured in various manners as described elsewhere in this application to include the described components.

The sensor package 210 may be a MEMS, accelerometer, pressure, or temperature sensor package. For example, the accelerometer sensor package may be used for deploying safety systems, such as air bags, active restraints, or similar systems. The sensor package 210 may be a leadless sensor package and may be configured to form a solderless connection with the terminals. Further, the sensor package 210 may have the attributes of other sensor packages described elsewhere in this application.

In one example, the housing 212 may include a first opening that forms a first cavity 220. The first cavity 220 may be configured to receive a mating connector, for example, from a wire harness to electrically connect the sensor package 210 to a controller. A connection portion of the terminals 216 may extend into the first cavity 220 and be configured to provide electrical connection to mating terminals in the mating connector. A pad portion of the terminals 216 may extend into a second cavity 218 formed by a second opening. The pad portion of the terminals 216 may be configured to align with and contact pads on the sensor package 210. The shape of the terminals 216 may interact with both the housing 212 and the sensor package 210 to provide a spring force against the sensor package 210 when the sensor package 210 is fully inserted into the second cavity 218. The spring force may provide a continuous and firm physical contact between the terminals 216 and the sensor package 210. The spring force may also provide a firm contact between the sensor 210 and the housing 212.

In some implementations, the housing 212 may include surfaces to locate the sensor package 210 relative to the terminals 216. Surface 240 may constrain the sensor longitudinally along the direction of insertion. Surface 242 may constrain the sensor vertically perpendicular to the direction of insertion. Further, another surface may be provided to constrain the sensor horizontally perpendicular to both surface 240 and 242. These surfaces may include various details such as crush ribs, locking mechanism, guides, or other features to aid the positioning and securing of the sensor package 210 in the housing 216.

As will be discussed elsewhere in this application, various shapes of terminals may be used to provide the spring force along different vectors to secure the sensor against the locating surfaces of the housing 212.

In some implementations, the sensor package 210 may be inserted into the housing 212 from the second opening forming the second cavity 218. The terminals 216 may be inserted from either the first opening forming the first cavity 220 or the second opening forming the second cavity 218. The housing 212 may include slots or holes into which the terminals 216 may be inserted. The slots or holes may be undersized or elongated such that the terminals 216 are pressed into and secured by insertion into the holes or slots. Further, surfaces on the housing 212 may interface with surfaces on the terminals 216 to ensure proper location and orientation of the terminals 216 within the housing 212 and relative to the sensor package 210.

The terminals 216 may be inserted prior to the sensor package 210. Further, the terminals 216 may deflect slightly to provide the spring force against the sensor package 210 as the sensor package 210 is fully inserted into the housing 212. In some implementations, the sensor package 210 may be inserted prior to the terminals 216. The terminals 216 may be deflected during insertion to provide the spring force. Further, locking members may be provided to secure the terminals 216 in place when fully inserted. In some implementations, the terminals may be pre-molded into a sub-assembly and then inserted or inserted as a lead frame then later punched to provide electrical isolation.

The second cavity 218 may be sealed with potting or a cover. The potting or cover may secure the sensor package 210 in position within the housing 212. The potting and cover may function to protect the sensor and electrical connection from environmental conditions and constrain the sensor over the life of the assembly. The cover can be snap-fit or welded (Laser, ultrasonic, spin, vibration, etc) to the housing. The potting can be an epoxy or low pressure molding material.

It is understood that any of the features of the sensor assembly described above with respect to FIG. 2 may be used in conjunction with other features described elsewhere in this application.

Figure 3:
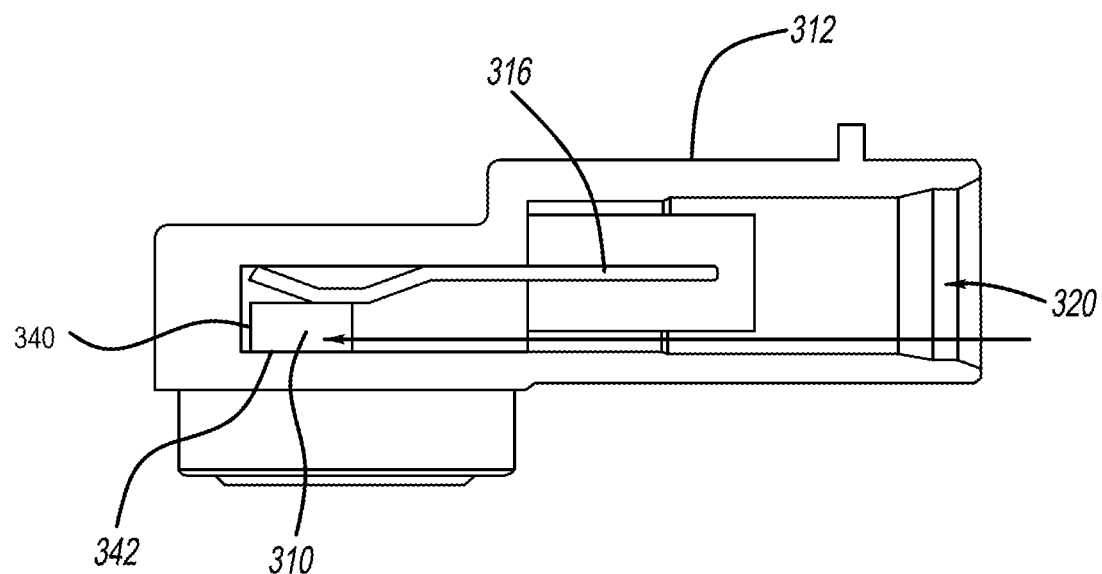
FIG. 3 is a sectional side view of a sensor assembly illustrating a insertion of the sensor from the same cavity as the terminals.

FIG. 3 is a sectional side view of a sensor assembly illustrating a insertion of the sensor from the same cavity as the terminals. The sensor assembly includes a housing 312, a sensor package 310, and terminals 316. The housing 312 may be a polymer housing and manufactured in various manners as described elsewhere in this application to include the described components.

The sensor package 310 may be a MEMS, accelerometer, pressure, or temperature sensor package. For example, the accelerometer sensor package may be used for deploying safety systems, such as air bags, active restraints, or similar systems. The sensor package 310 may be a leadless sensor package and may be configured to form a solderless connection with the terminals. Further, the sensor package 310 may have the attributes of other sensor packages described elsewhere in this application.

In one example, the housing 312 may include a first opening that forms a first cavity 320. The first cavity 320 may be configured to receive a mating connector, for example, from a wire harness to electrically connect the sensor package 310 to a controller. A connection portion of the terminals 316 may extend into the first cavity 320 and be configured to provide electrical connection to mating terminals in the mating connector.

A pad portion of the terminals 316 may extend toward the back wall of the first cavity 320. The pad portion of the terminals 316 may be configured to align with and contact pads on the sensor package 310. The shape of the terminals 316 may interact with both the housing 312 and the sensor package 310 to provide a spring force against the sensor package 310 when the sensor package 310 is fully inserted into the second cavity 318. The spring force may provide a continuous and firm physical contact between the terminals 316 and the sensor package 310. The spring force may also provide a firm contact between the sensor 310 and the housing 312.

In some implementations, the housing 312 may include surfaces to locate the sensor package 310 relative to the terminals 316. Surface 340 may constrain the sensor longitudinally along the direction of insertion. Surface 342 may constrain the sensor vertically perpendicular to the direction of insertion. Further, another surface may be provided to constrain the sensor horizontally perpendicular to both surface 240 and 342. These surfaces may include various details such as crush ribs, locking mechanism, guides, or other features to aid the positioning and securing of the sensor package 310 in the housing 316.

As will be discussed elsewhere in this application, various shapes of terminals may be used to provide the spring force along different vectors to secure the sensor against the locating surfaces of the housing 312.

In some implementations, the sensor package 310 may be inserted into the housing 312 from the first opening forming the first cavity 320. Further, the terminals 316 may be inserted from the first opening forming the first cavity 320. As such, the sensor package 310 and the terminals 316 may be inserted from the same opening. Having a single opening may reduce manufacturing complications and/or improve reliability. The housing 312 may include slots or holes into which the terminals 316 may be inserted. The slots or holes may be undersized or elongated such that the terminals 316 are pressed into and secured by insertion into the holes or slots. Further, surfaces on the housing 312 may interface with surfaces on the terminals 316 to ensure proper location and orientation of the terminals 316 within the housing 312 and relative to the sensor package 310.

The terminals 316 may be inserted prior to the sensor package 310. Further, the terminals 316 may deflect slightly to provide the spring force against the sensor package 310 as the sensor package 310 is fully inserted into the housing 312. In some implementations, the sensor package 310 may be inserted prior to the terminals 316. The terminals 316 may be deflected during insertion to provide the spring force. Further, locking members may be provided to secure the terminals 316 in place when fully inserted. In some implementations, the terminals may be pre-molded into a sub-assembly and then inserted or inserted as a lead frame then later punched to provide electrical isolation.

It is understood that any of the features of the sensor assembly described above with respect to FIG. 3 may be used in conjunction with other features described elsewhere in this application.

Figure 4:
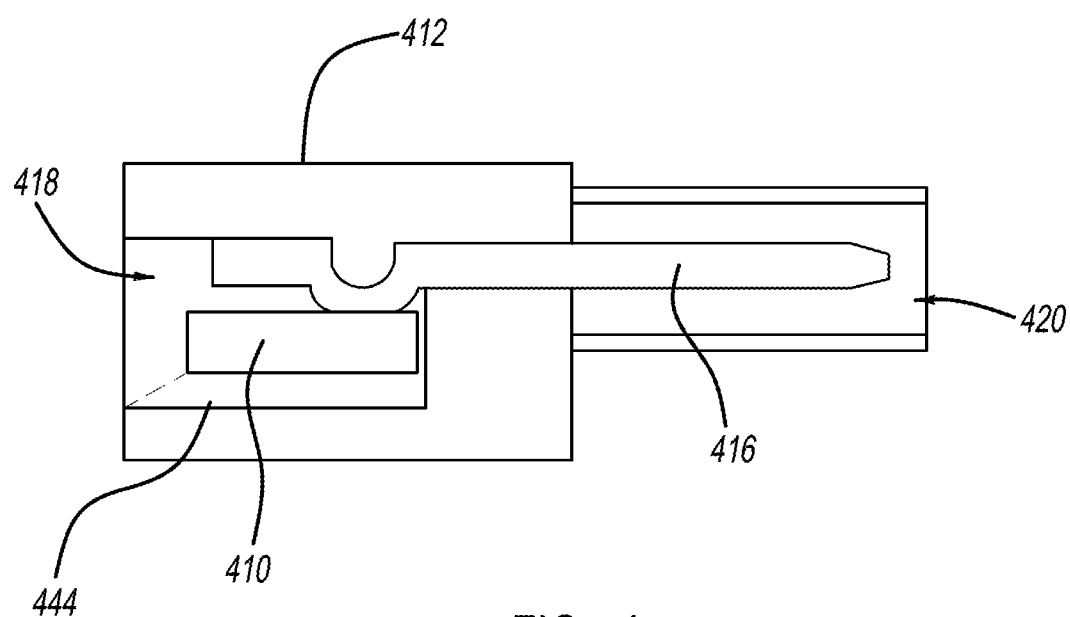
FIG. 4 is a sectional side view of a sensor assembly illustrating support members of the housing.

FIG. 4 is a sectional side view of a sensor assembly illustrating support members of the housing.

The sensor assembly includes a housing 412, a sensor package 410, and terminals 416. The housing 412 may be a polymer housing and manufactured in various manners as described elsewhere in this application to include the described components.

The sensor package 410 may be a MEMS, accelerometer, pressure, or temperature sensor package. For example, the accelerometer sensor package may be used for deploying safety systems, such as air bags, active restraints, or similar systems. The sensor package 410 may be a leadless sensor package and may be configured to form a solderless connection with the terminals. Further, the sensor package 410 may have the attributes of other sensor packages described elsewhere in this application.

In one example, the housing 412 may include a first opening that forms a first cavity 420. The first cavity 420 may be configured to receive a mating connector, for example, from a wire harness to electrically connect the sensor package 410 to a controller. A connection portion of the terminals 416 may extend into the first cavity 420 and be configured to provide electrical connection to mating terminals in the mating connector. A pad portion of the terminals 416 may extend into a second cavity 418 formed by a second opening. The pad portion of the terminals 416 may be configured to align with and contact pads on the sensor package 410. The shape of the terminals 216 may interact with both the housing 412 and the sensor package 410 to provide a spring force against the sensor package 410 when the sensor package 410 is fully inserted into the second cavity 418. The spring force may provide a continuous and firm physical contact between the terminals 416 and the sensor package 410. The spring force may also provide a firm contact between the sensor 410 and the housing 412.

As will be discussed elsewhere in this application, various shapes of terminals 416 may be used to provide the spring force along different vectors to secure the sensor 410 against the locating surfaces of the housing 412. Also, as discussed elsewhere, the housing 412 may include surfaces to locate the sensor package 410 relative to the terminals 416.

These surfaces may include various details such as crush ribs, deflecting beams, locking mechanisms, guides, or other features to aid the positioning and securing of the sensor package 410 in the housing 416. Crush ribs may be used to align the sensor during installation, and to constrain the sensor or prevent movement of the sensor after assembly. Other features can provide retention, snap fits within the housing or undercut geometry to prevent movement.

One example is provided as crush rib 444 which is configured to interfere with the sensor package 410 and deform as the sensor package 410 is fully inserted into the second cavity 418. The crush rib 444 may be a plastic detail protruding from but unitary with a locating surface of the housing. The crush rib 444 may provide a force against the sensor package 410 helping to secure the sensor package 410 in place. In some implementations, the crush rib 444 may be located opposite the terminals 416. As such, the force from the crush rib 444 may oppose and spring force. Further, the crush rib 444 may be located to provide a force with components that are opposite components of the spring force provided from the terminals 416, thereby securing the sensor package along multiple axes. While crush rib 444 may be shown only on the horizontal locating surface, one or more crush ribs may be located on any of the locating surfaces of the housing 412 that interact with the sensor package 410, including any of the locating surfaces described elsewhere in this application.

In some implementations, the sensor package 410 may be inserted into the housing 412 from the second opening forming the second cavity 418. The terminals 416 may be inserted from either the first opening forming the first cavity 420 or the second opening forming the second cavity 418. The housing 412 may include slots or holes into which the terminals 416 may be inserted. The slots or holes may be undersized or elongated such that the terminals 416 are pressed into and secured by insertion into the holes or slots. Further, surfaces on the housing 412 may interface with surfaces on the terminals 416 to ensure proper location and orientation of the terminals 416 within the housing 412 and relative to the sensor package 410.

The terminals 416 may be inserted prior to the sensor package 410. Further, the terminals 416 may deflect slightly to provide the spring force against the sensor package 410 as the sensor package 410 is fully inserted into the housing 412. In some implementations, the sensor package 410 may be inserted prior to the terminals 416. The terminals 416 may be deflected during insertion to provide the spring force. Further, locking members may be provided to secure the terminals 416 in place when fully inserted. In some implementations, the terminals may be pre-molded into a sub-assembly and then inserted or inserted as a lead frame then later punched to provide electrical isolation.

It is understood that any of the features of the sensor assembly described above with respect to FIG. 4 may be used in conjunction with other features described elsewhere in this application.

Figure 5A:
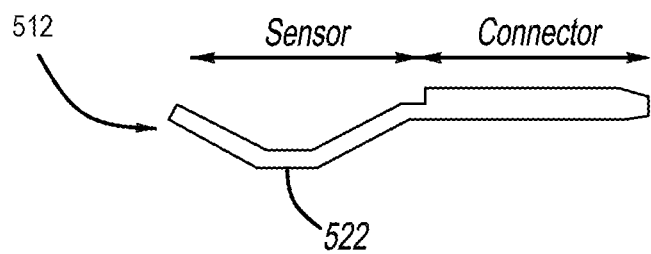
FIGS. 5A-5F are side views of some possible spring terminal implementations for the sensor assembly.

FIGS. 5A-5F are side views of some possible spring terminal implementations for the sensor assembly. FIG. 5A illustrates a terminal 512 with a connector end and a pad end. The connector end is straight then the terminal bends toward the pad end. The pad end has a first bend relative to the connector end and extends straight at an angle to the connector end. The pad end then has a second bed and a contact portion 522 of the terminal extends straight and parallel to the connector end. The pad end then has a third bend and extends at an angle to the connector end. The angle after the first bend and the angle after the third bend may approximately opposite in direction and may be approximately the same in degree. The angles may be between approximately 10 and 40 degrees. The terminal 512 may be positioned to contact and the pad of the sensor package at the contact portion 522. The spring force will also be applied at the contact portion 522.

Figure 5B:
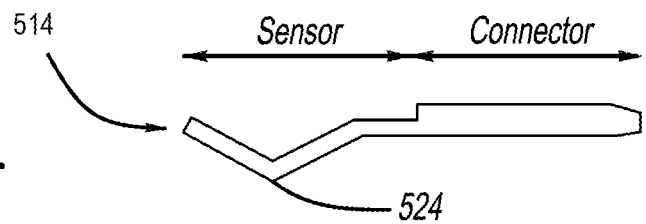

FIG. 5B illustrates a terminal 514 with a connector end and a pad end. The connector end is straight then the terminal bends toward the pad end. The pad end has a first bend relative to the connector end and extends straight at an angle to the connector end. The pad end then has a second bend and also extends at an angle to the connector end. The angle after the first bend and angle after the second bend may approximately opposite in direction and may be approximately the same in degree. The angles may be between approximately 10 and 40 degrees. The second bend forms a contact portion 524 of the terminal 514. The terminal 514 may be positioned to contact and the pad of the sensor package at the contact portion 524. The spring force will also be applied at the contact portion 524.

Figure 5C:
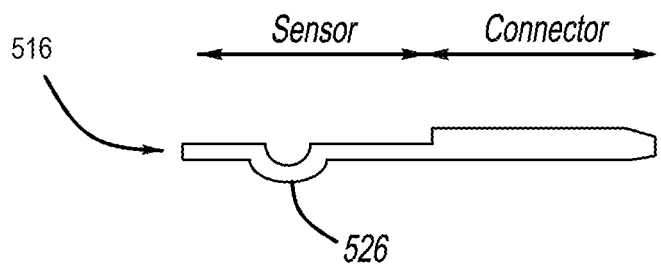

FIG. 5C illustrates a terminal 516 with a connector end and a pad end. The connector end is straight then the terminal bends toward the pad end. The pad end may extend straight and co-linear from the connector portion but then has a curved portion. The curved portion may curve at a constant radius and may curve approximately 180 degrees. After, the curved portion the pad end may extend approximately co-linear with the connector portion again. The curved portion forms a contact portion 526 of the terminal 516. The terminal 516 may be positioned to contact and the pad of the sensor package at the contact portion 526. The spring force will also be applied at the contact portion 526.

Figure 5D:
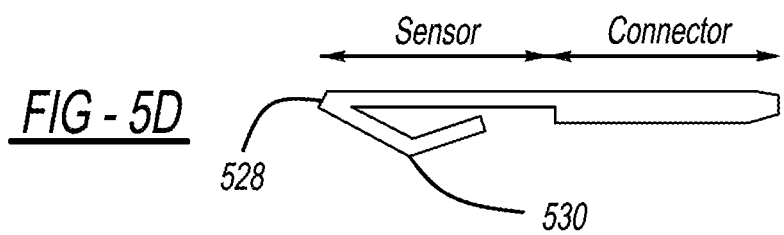

FIG. 5D illustrates a terminal 528 with a connector end and a pad end. The connector end is straight then the terminal bends near the pad end. The pad end may extend straight and co-linear from the connector end. The pad end has a first bend relative to the connector end. The first bend directs the terminal back toward the connector end and extends straight at an angle to the connector end. The pad end then has a second bend and also extends at an angle to the connector end. The angle after the first bend and the angle after the second bend may approximately opposite in direction and may be approximately the same in degree. The angles may be between approximately 10 and 40 degrees. The second bend forms a contact portion 530 of the terminal 528. The terminal 528 may be positioned to contact and the pad of the sensor package at the contact portion 530. The spring force will also be applied at the contact portion 530.

Figure 5E:
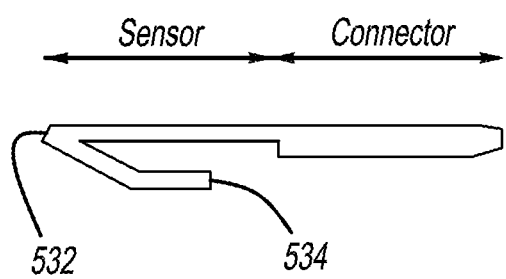

FIG. 5E illustrates a terminal 532 with a connector end and a pad end. The connector end is straight then the terminal bends near the pad end. The pad end may extend straight and co-linear from the connector end. The pad end has a first bend relative to the connector end. The first bend directs the terminal back toward the connector end and extends straight at an angle to the connector end. The pad end then has a second bend and also extends parallel to the connector end. The angle may be between approximately 10 and 40 degrees. The parallel portion after the second bend forms a contact portion 534 of the terminal 532. The terminal 532 may be positioned to contact and the pad of the sensor package at the contact portion 534. The spring force will also be applied at the contact portion 534.

Figure 5F:
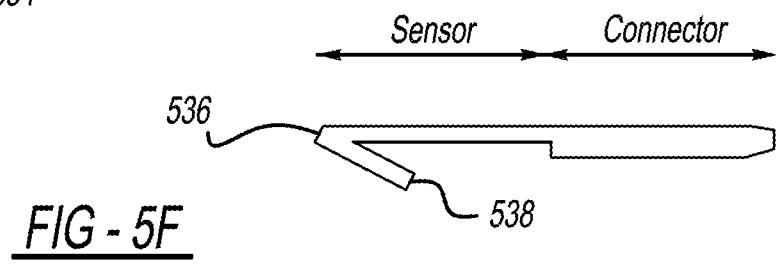

FIG. 5F illustrates a terminal 536 with a connector end and a pad end. The connector end is straight then the terminal bends near the pad end. The pad end may extend straight and co-linear from the connector end. The pad end has a first bend relative to the connector end. The first bend directs the terminal back toward the connector end and extends straight at an angle to the connector end. The end of the terminal may form a contact portion 538 of the terminal 536. The angle may be between approximately 10 and 40 degrees. The terminal 536 may be positioned to contact and the pad of the sensor package at the contact portion 538. The spring force will also be applied at the contact portion 538.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

What is claimed is:

1. An sensor assembly comprising:
   a molded housing having a connector opening configured to mate with a wire harness connector;
   a leadless sensor package including conductive pads exposed in a surface of the leadless sensor package; and
   terminals inserted into the molded housing and extending into the connector opening, each terminal forming an electrical and mechanical connection with a pad of the conductive pads in the surface of the leadless sensor package, wherein the electrical and mechanical connections are maintained by a spring force of the terminals applied between the molded housing and the conductive pads, such that the spring force of the terminal pressing on the conductive pads forces an opposite side of the leadless sensor package into contact with a surface of the molded housing.

2. The assembly of claim 1, wherein the electrical and mechanical connections with the conductive pads are solderless connections.

3. The assembly of claim 1, wherein the leadless sensor package interacts with at least one crush rib in the molded housing to restrain movement of the leadless sensor package.

4. The assembly of claim 1, wherein the molded housing includes a bushing for in vehicle mounting and the leadless sensor package is configured to detect impact conditions for safety system deployment.

5. The system according to claim 1, wherein the leadless sensor package is inserted into the housing through an access opening.

6. The system according to claim 5, further comprising potting or a cover over the access opening to seal the sensor package within the housing.

7. The assembly of claim 1, wherein the conductive pads are flush with the surface of the leadless sensor package.

8. The assembly of claim 1, wherein the terminals have a pad end that connects with a corresponding conductive pad where the pad end includes a curved portion with a constant radius.

9. The assembly of claim 1, wherein the terminals have a pad end that connects with a corresponding conductive pad where the pad end includes a first bend directing the terminal back toward a connector end of the terminal.

10. The assembly of claim 9, wherein the pad end includes a second bend that directs the terminal parallel to the conductive pad.

11. The assembly of claim 1, wherein the leadless sensor package is insert molded into the housing.

12. A method for assembling a sensor connector assembly, the method comprising:
   providing a housing having a connector opening that forms a cavity configured to receive a wire harness connector;
   inserting terminals into the housing, the terminals extending into the cavity; and
   inserting a leadless sensor package into the housing, the leadless sensor package including conductive pads, the terminals providing an electrical and mechanical connection with the conductive pads on the sensor package, wherein the leadless sensor package is inserted into the housing through the connector opening.

13. The method according to claim 12, wherein the terminals are inserted into the housing through the connector opening.

14. The method according to claim 12, wherein the leadless sensor package is inserted after the terminals are inserted into the housing.

15. The method according to claim 12, wherein terminals are insert molded into the housing or pre-molded into a sub-assembly before insertion into the housing.

16. The method of claim 12, wherein the electrical and mechanical connections with the conductive pads are solderless connections.

17. The method of claim 12, wherein the electrical and mechanical connections are maintained by a spring force of the terminals applied between the housing and the conductive pads.

18. The method of claim 12, wherein the leadless sensor package is an accelerometer sensor package or a pressure sensor package to detect impact conditions for safety system deployment.

19. A method for assembling a sensor connector assembly, the method comprising:
   providing a housing having a connector opening configured to mate with a wire harness connector;
   inserting terminals into the housing; and
   inserting a leadless sensor package into the housing, the leadless sensor package including conductive pads, the terminals providing an electrical and mechanical connection with the conductive pads on the sensor package, wherein the leadless sensor package is inserted into the housing through the connector opening and the terminals are inserted after the leadless sensor package is inserted into the housing.

* * * * *